US009853880B2

(12) United States Patent
Valencia Lopez

(10) Patent No.: US 9,853,880 B2
(45) Date of Patent: Dec. 26, 2017

(54) 2 LEVEL ROUTING IN CCN

(71) Applicant: Telefonaktiebolaget L M Ericsson (publ), Stockholm (SE)

(72) Inventor: Carlos Valencia Lopez, Leganes (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 155 days.

(21) Appl. No.: 14/726,850

(22) Filed: Jun. 1, 2015

(65) Prior Publication Data

US 2016/0352614 A1 Dec. 1, 2016

(51) Int. Cl.
*H04L 12/755* (2013.01)
*H04L 12/773* (2013.01)
*H04L 12/741* (2013.01)
*H04L 29/12* (2006.01)

(52) U.S. Cl.
CPC ............ *H04L 45/021* (2013.01); *H04L 45/60* (2013.01); *H04L 45/745* (2013.01); *H04L 61/1511* (2013.01); *H04L 61/1582* (2013.01); *H04L 61/303* (2013.01)

(58) Field of Classification Search
CPC ............... H04L 45/021; H04L 61/1511; H04L 67/2804; H04L 45/60; H04L 45/745
See application file for complete search history.

(56) References Cited

U.S. PATENT DOCUMENTS

2014/0281505 A1* 9/2014 Zhang ................... H04L 9/3268 713/158
2015/0039784 A1* 2/2015 Westphal .............. H04L 45/306 709/240
2015/0113166 A1* 4/2015 Mosko .................... H04L 45/14 709/242

(Continued)

FOREIGN PATENT DOCUMENTS

EP 2530899 A1 12/2012
EP 2863614 A1 4/2015

OTHER PUBLICATIONS

"Autonomous System (Internet)," From Wikipedia, the free encyclopedia, 3 pages.

(Continued)

*Primary Examiner* — Min Jung
(74) *Attorney, Agent, or Firm* — Nicholson, De Vos, Webster & Elliot, LLP

(57) ABSTRACT

Exemplary methods at a content centric networking (CCN) gateway located at an autonomous system (AS), wherein the CCN gateway is communicatively coupled to a CCN domain name system (DNS) server, include receiving, on a first face, a first interest message comprising of a first content name identifying a first content being requested by the first interest message. The methods include in response to determining the first content is not located at the AS, determining a first remote AS name that identifies a first remote AS where the first content is located, generating a (Continued)

first 2-level (2L) content name comprising of the first remote AS name and the first content name, forwarding the first interest message comprising of the first 2L content name, and in response to receiving a first content object (CO) message comprising of the first 2L content name and the first content, forwarding the first content.

30 Claims, 10 Drawing Sheets

(56) References Cited

U.S. PATENT DOCUMENTS

2015/0350078 A1* 12/2015 Azgin .................. H04L 45/306
 370/392
2016/0020990 A1* 1/2016 Mahadevan .......... H04L 45/026
 709/204

OTHER PUBLICATIONS

RFC 2460: Deering S., et al., "Internet Protocol Version 6 (IPv6)," 1998, 39 pages, Network Working Group, Standards Track, Request for comments: 2460.
RFC 791: Postel, "DARPA Internet Program Protocol Specification," Sep. 1981, 50 pages, Request for comments: 791.
Van Adrichem NLM., et al., "Globally Accessible Names in Named Data Networking," Computer Communications Workshops (INFOCOM Wkshps), 2013 IEEE Conference On, IEEE, Apr. 14, 2013, pp. 345-350.
"CCNx 1.0—Routing in CCN, New Solutions Needed for an Old Problem," Computer Science Laboratory, Networking & Distributed Systems, Palo Alto Research Center, Inc., http://www.ccnx.org/pubs/hhg/2.2%20An%20Overview%20of%20Routing%20Solutions.pdf, (Mar. 2014), 18 pages.
Mosko, "CCNx 1.0 Protocol Specification Roadmap," Palo Alto Research Center, Inc., (Apr. 14, 2014), 105 pages.

* cited by examiner

| Operation | CS 210 {content_name, content_object} | PIT 211 {content_name, face} | FIB 212 {content_name, face} | IRT 213 {content_name, AS_name} |
|---|---|---|---|---|
| 405 | | | {AS2, F#10} | |
| 410 RX Int1 {Carlos/Docs/Doc1} on face 0 | | | {AS2, F#10} | |
| 415 TX DNS Req {Carlos/Docs/Doc1} | | | {AS2, F#10} | |
| 420 RX DNS Resp {Carlos/Docs, AS2} | | | {AS2, F#10} | |
| 425 Update IRT with {Carlos/Docs, AS2} | | | {AS2, F#10} | {Carlos/Docs, AS2} |
| 430 Generate 2L name & add to PIT | | {AS2|Carlos/Docs/Doc1, F#0} | {AS2, F#10} | {Carlos/Docs, AS2} |
| 435 TX Int1 {AS2|Carlos/Docs/Doc1} on face 10 | | {AS2|Carlos/Docs/Doc1, F#0} | {AS2, F#10} | {Carlos/Docs, AS2} |
| 440 RX Int2 {Carlos/Docs/Doc1} on face 1 | | {AS2|Carlos/Docs/Doc1, F#0} | {AS2, F#10} | {Carlos/Docs, AS2} |
| 445 Generate 2L name & add to PIT | | {AS2|Carlos/Docs/Doc1, F#0, F#1} | {AS2, F#10} | {Carlos/Docs, AS2} |
| 450 RX CO1 {AS2|Carlos/Docs/Doc1, Obj1} on face 10 | | {AS2|Carlos/Docs/Doc1, F#0, F#1} | {AS2, F#10} | {Carlos/Docs, AS2} |
| 455 Identify faces to forward CO1 on | | {AS2|Carlos/Docs/Doc1, F#0, F#1} | {AS2, F#10} | {Carlos/Docs, AS2} |
| 460 Add content name & Obj1 to CS | {Carlos/Docs/Doc1, Obj1} | {AS2|Carlos/Docs/Doc1, F#0, F#1} | {AS2, F#10} | {Carlos/Docs, AS2} |
| 465 TX CO1 {Carlos/Docs/Doc1, Obj1} on faces 0 & 1 | {Carlos/Docs/Doc1, Obj1} | | {AS2, F#10} | {Carlos/Docs, AS2} |
| 470 RX Int3 {Carlos/Docs/Doc1} on face 2 | {Carlos/Docs/Doc1, Obj1} | | {AS2, F#10} | {Carlos/Docs, AS2} |
| 475 TX CO3 {Carlos/Docs/Doc1, Obj1} on face 2 | {Carlos/Docs/Doc1, Obj1} | | {AS2, F#10} | {Carlos/Docs, AS2} |

FIG. 4

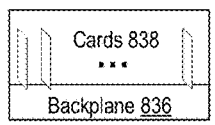
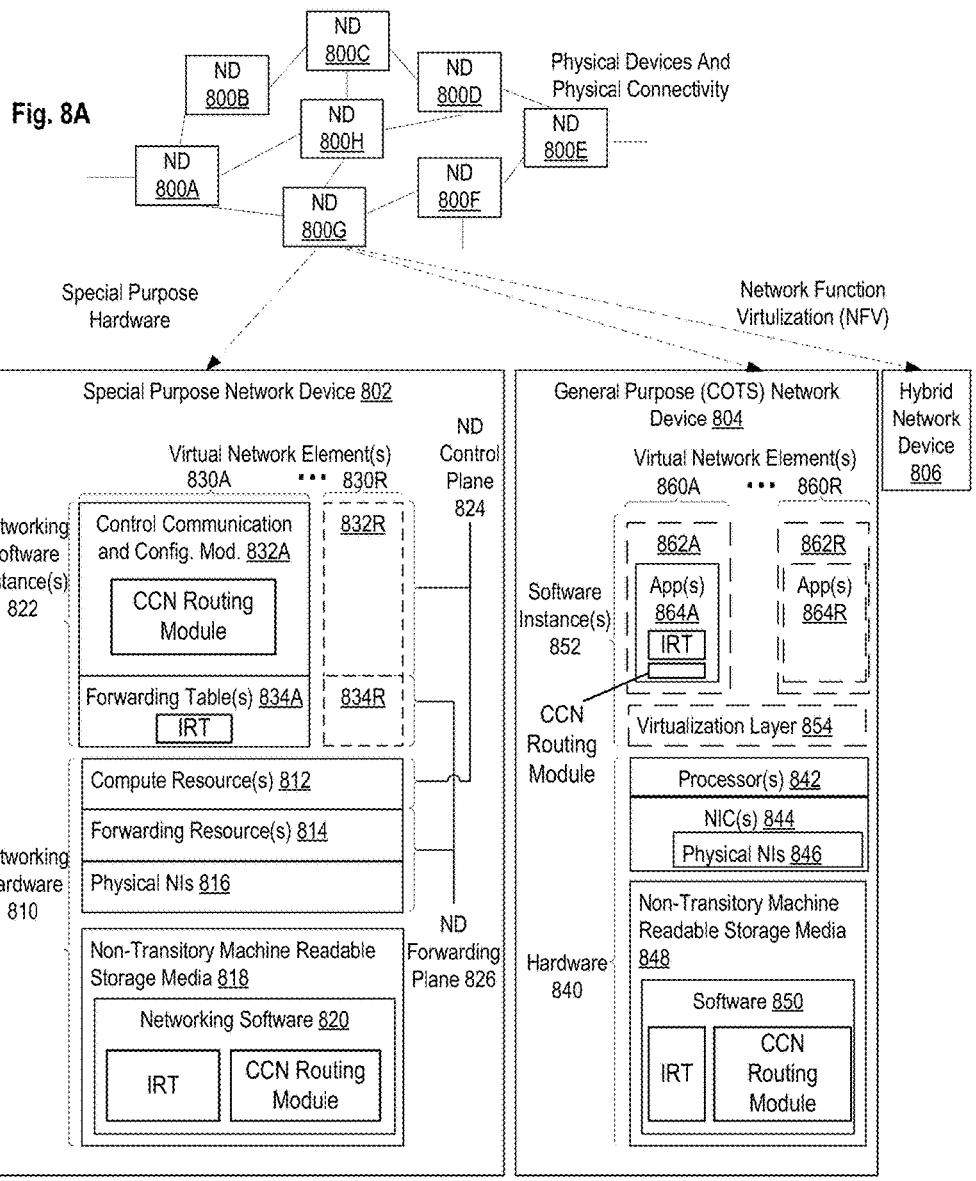

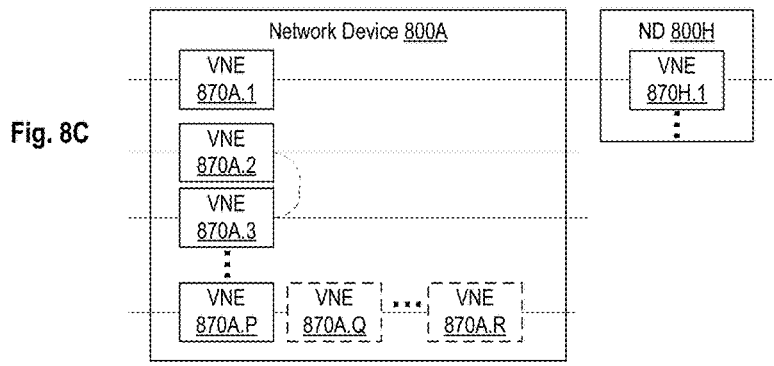
Fig. 8C
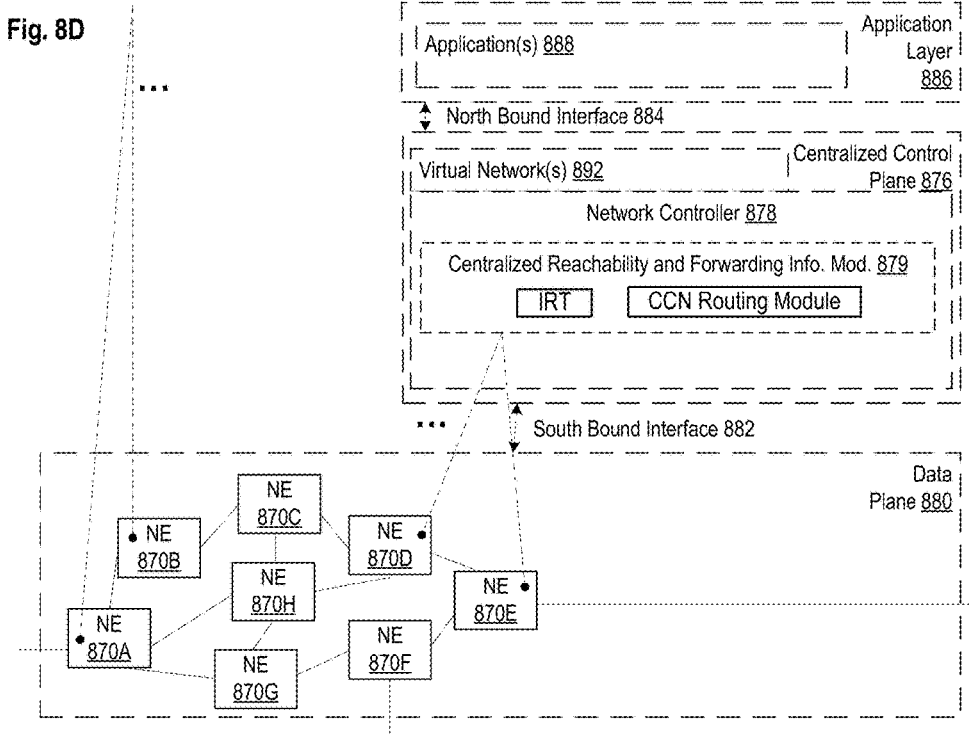
Fig. 8D
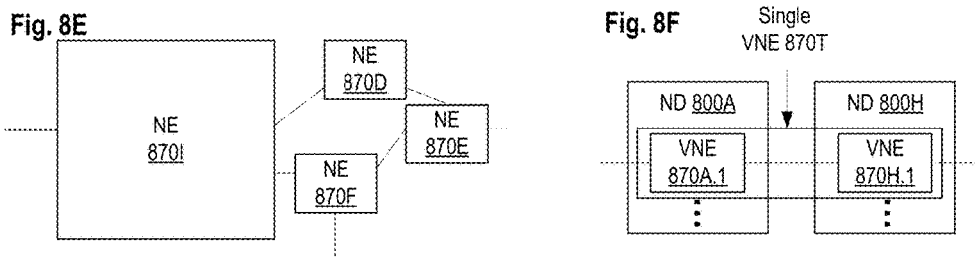
Fig. 8E
Fig. 8F

2 LEVEL ROUTING IN CCN

FIELD

Embodiments of the invention relate to the field of packet networks, and more specifically, to the 2 level routing of packets in content centric networks (CCNs).

BACKGROUND

An information centric network (ICN) is a conceptualization of a networking protocol stack, in particular layers 3 and above of a network protocol stack. CCN network as well as similar networks, such as, for example, named data networking (NDN) networks are particular architectures and implementations of an ICN network. ICN, CCN, and NDN networks are based on the premise of naming resources in these networks. In particular, the naming relates to the use of a globally shared namespace for objects that allows entities in these networks to retrieve any content of interest. NDN networks and CCN networks have similar architectures, and for sake of clarity, examples related to CCN networks are discussed herein below.

Within a CCN network, a name is utilized to identify a content object instead of an Internet Protocol (IP) address of the host of the content. In an IP network, routing is based on host names (e.g., source and destination addresses). In a CCN network by contrast, routing is based on a uniform resource identifier (URI) or similar identifier for a content object. CCN routing is performed hop-by-hop, using longest prefix matching on the CCN name. All communications seeking to access data are framed as a request and response transaction. A CCN client (e.g., executed by user equipment) sends a message referred to as a CCN interest packet/message to the nodes in the CCN network. An interest packet/message may herein be referred to simply as an "interest". The nodes of the CCN network respond with a CCN object identified by a CCN name in the CCN interest. These CCN objects are returned via a CCN response referred to as a CCN content object (CO) packet/message. A CO message/packet may herein be referred to simply as a "CO".

All content object packets are cryptographically signed by their initial provider. A CCN client can thus verify the integrity and authenticity of the content even if the packet comes from untrusted links or untrusted hosts. As a direct effect, CCN nodes in the CCN network are allowed to cache packets locally in a table called the content store (CS). When a CCN node receives a CCN interest packet, the CCN node can determine whether its local content store has the requested CCN object and, if so, can send the CCN object to the requesting CCN client. The look up in the content store is by the CCN name. If the CCN name is not found in the local content store, then the CCN interest is forwarded according to entries for the CCN name in a forwarding information base (FIB) of the CCN node.

Routing strategies in Internet Protocol version 4 (IPv4) and Internet Protocol version 6 (IPv6) are not feasible in CCN because of the difference in the variable use for routing. In IP networks, routing is performed based on the endpoint. Thus, the routing space is limited by the number of addresses available in the protocol. In CCN the routing is based on names and although the domains can be similar to IP addresses, each device may have one or several names that can remain the same independently of where they are. In IP this is solved with external services that keep the mapping between the user and the endpoint address. However, in CCN this will not work because the device name should be always the same so the mapping cannot be performed, but instead huge routing tables should be kept to route any name.

SUMMARY

Exemplary methods performed by a content centric networking (CCN) gateway located at an autonomous system (AS), wherein the CCN gateway is communicatively coupled to a CCN domain name system (DNS) server, includes receiving, on a first face, a first interest message comprising of a first content name identifying a first content being requested by the first interest message. The methods further include in response to determining the first content is not located at the AS, determining a first remote AS name that identifies a first remote AS where the first content is located. The methods further include generating a first 2-level (2L) content name comprising of the first remote AS name and the first content name. The methods further include forwarding the first interest message comprising of the first 2L content name. The methods further include in response to receiving a first content object (CO) message comprising of the first 2L content name and the first content, forwarding the first content.

According to one embodiment, determining the first remote AS name comprises determining whether the first content name is included in an interest redirect table (IRT), wherein the IRT includes a plurality of entries, each entry comprising of a content name prefix and an associated remote AS name, wherein each remote AS name identifies a remote AS where a content identified by the associated content name prefix is located at.

According to one embodiment, the methods further include in response to determining the first content name does not match any of the content name prefixes in the IRT, sending a DNS request comprising of the first content name to the CCN DNS server, receiving, from the CCN DNS server, a DNS response comprising of a content name prefix and the first remote AS name, and adding a first entry to the IRT, the first entry comprising of the first remote AS name and the content name prefix included in the DNS response.

According to one embodiment, the methods further include in response to determining the first content name matches a content name prefix in the IRT, determining the first remote AS name to be a remote AS name that is associated with the content name prefix that matches the first content name.

According to one embodiment, forwarding the first interest message comprises determining the first 2L content name is not in a pending interest table (PIT), wherein the PIT includes a plurality of entries, each entry comprising of a 2L content name or a content name and one or more associated face identifiers (IDs), wherein each face ID identifies a face on which an interest message requesting for a content identified by the associated 2L content name or content name was received, and adding a first entry to the PIT, the first entry comprising the first 2L content name and a first face ID identifying the first face on which the first interest was received.

According to one embodiment, forwarding the first content comprises replacing the first 2L content name in the first CO message with the first content name, and forwarding the first CO message comprising of the first content name and the first content.

According to one embodiment, the methods further include receiving, on a second face, a second interest message comprising of a second content name identifying a second content being requested by the second interest message. The methods further include in response to determining the second content is not located at the AS, determining a second remote AS name that identifies a second remote AS where the second content is located. The methods further include generating a second 2L content name comprising of the second remote AS name and the second content name. The methods further include determining an interest message requesting for the second content has been forwarded, and preventing multiple interest messages requesting for the second content from being forwarded by dropping the second interest message.

According to one embodiment, determining the interest message requesting for the second content has been forwarded comprises determining the second 2L content name is in a pending interest table (PIT), wherein the PIT includes a plurality of entries, each entry comprising of a 2L content name or a content name and one or more associated face identifiers (IDs), wherein each face ID identifies a face on which an interest message requesting for a content identified by the associated 2L content name or content name was received, and adding a face ID identifying the second face on which the second interest message was received to an entry that includes a 2L content name that matches the second 2L content name.

According to one embodiment, the methods further include in response to receiving a second content object (CO) message comprising of the second 2L content name and the second content, forwarding the second content on every face that is identified by face IDs included in the PIT entry that includes the 2L content name that matches the second 2L content name.

Exemplary methods performed by a content centric networking (CCN) domain name system (DNS) server that is communicatively coupled to a CCN gateway located at a first autonomous system (AS), include receiving a DNS request comprising of a first content name identifying a content. The methods further include in response to receiving the DNS request, determining an AS name of an AS where the content is located at. The methods further include determining a prefix of the first content name included in the DNS request, wherein the prefix of the first content name identifies a plurality of contents that are all located at the AS. The methods further include sending a DNS response comprising of the prefix of the first content name and the AS name that identifies the AS where the content is located at.

BRIEF DESCRIPTION OF THE DRAWINGS

The invention may best be understood by referring to the following description and accompanying drawings that are used to illustrate embodiments of the invention. In the drawings:

FIG. 4 is a block diagram illustrating a mechanism for performing 2-level routing in CCN according to one embodiment.

FIG. 8A illustrates connectivity between network devices (NDs) within an exemplary network, as well as three exemplary implementations of the NDs, according to some embodiments of the invention.

FIG. 8B illustrates an exemplary way to implement a special-purpose network device according to some embodiments of the invention.

FIG. 8C illustrates various exemplary ways in which virtual network elements (VNEs) may be coupled according to some embodiments of the invention.

FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 8E illustrates the simple case of where each of the NDs implements a single NE, but a centralized control plane has abstracted multiple of the NEs in different NDs into (to represent) a single NE in one of the virtual network(s), according to some embodiments of the invention.

FIG. 8F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DESCRIPTION OF EMBODIMENTS

Figure 1:
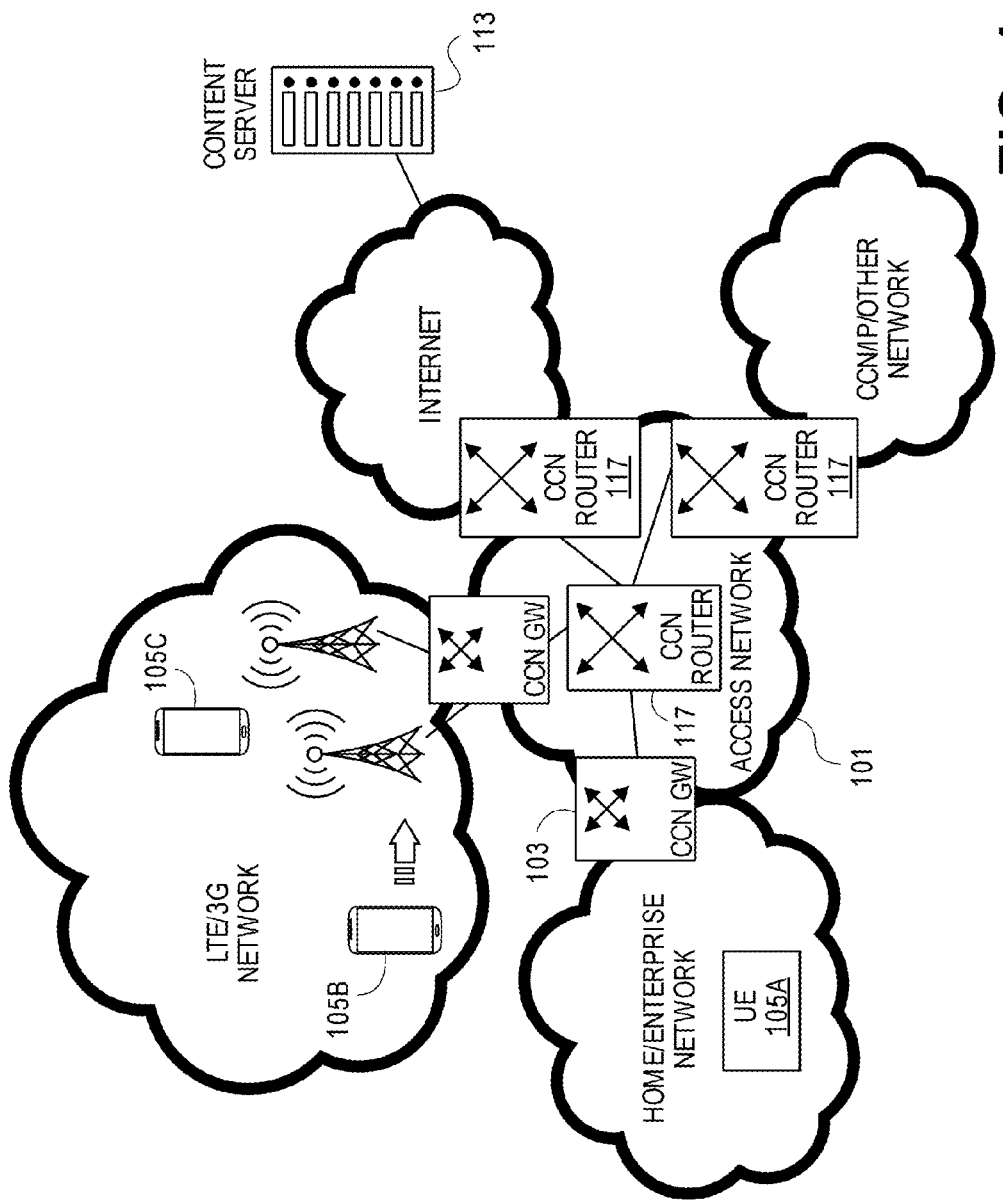
FIG. 1 is a block diagram illustrating an architecture of a content centric networking (CCN) network according to one embodiment.

The following description describes methods and apparatus for performing 2 level routing in content centric networks (CCNs). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 1 is a block diagram illustrating an architecture of a content centric networking (CCN) network according to one embodiment. The CCN network in this example is an access network, illustrated as access network 101. Access network 101 is in communication with a set of separately administered networks including a home/enterprise network, the Internet and an LTE/3G mobile network. The example shows that access network 101 can be further in communication with any number of additional CCN networks, IP networks or other types of networks. A CCN network can be utilized in other contexts such as home networks, enterprise networks, or similar independently administered public or private networks.

Access network 101 can have any number of nodes and can utilize any combination of layer 1 and layer 2 protocols for communication between the CCN nodes of access network 101. The CCN nodes are network devices (ND), as discussed further herein below. The CCN nodes include a set of CCN routers 117 and CCN gateways (GW) 103. The CCN routers 117 manage CCN interest packets, forwarding these packets toward the corresponding content server 113 and managing the content response messages by forwarding them toward the requesting user equipment 105A-C.

The CCN nodes that communicate with the user equipment 105A-C in the separately administered networks are the CCN gateways 103. The user equipment 105A-C can be any type of user device including mobile devices, laptop computers, desktop computers, console devices, workstations and similar computing devices.

Content server 113 can be any computing device in communication with access network 101. Access network 101 can be in communication with any number and variety of content servers 113. Content server 113 can be a server or similar computing device that hosts a set of services and resources such as data stores including web pages, audio/visual content, documents and similar static and/or dynamically generated data.

Figure 2:
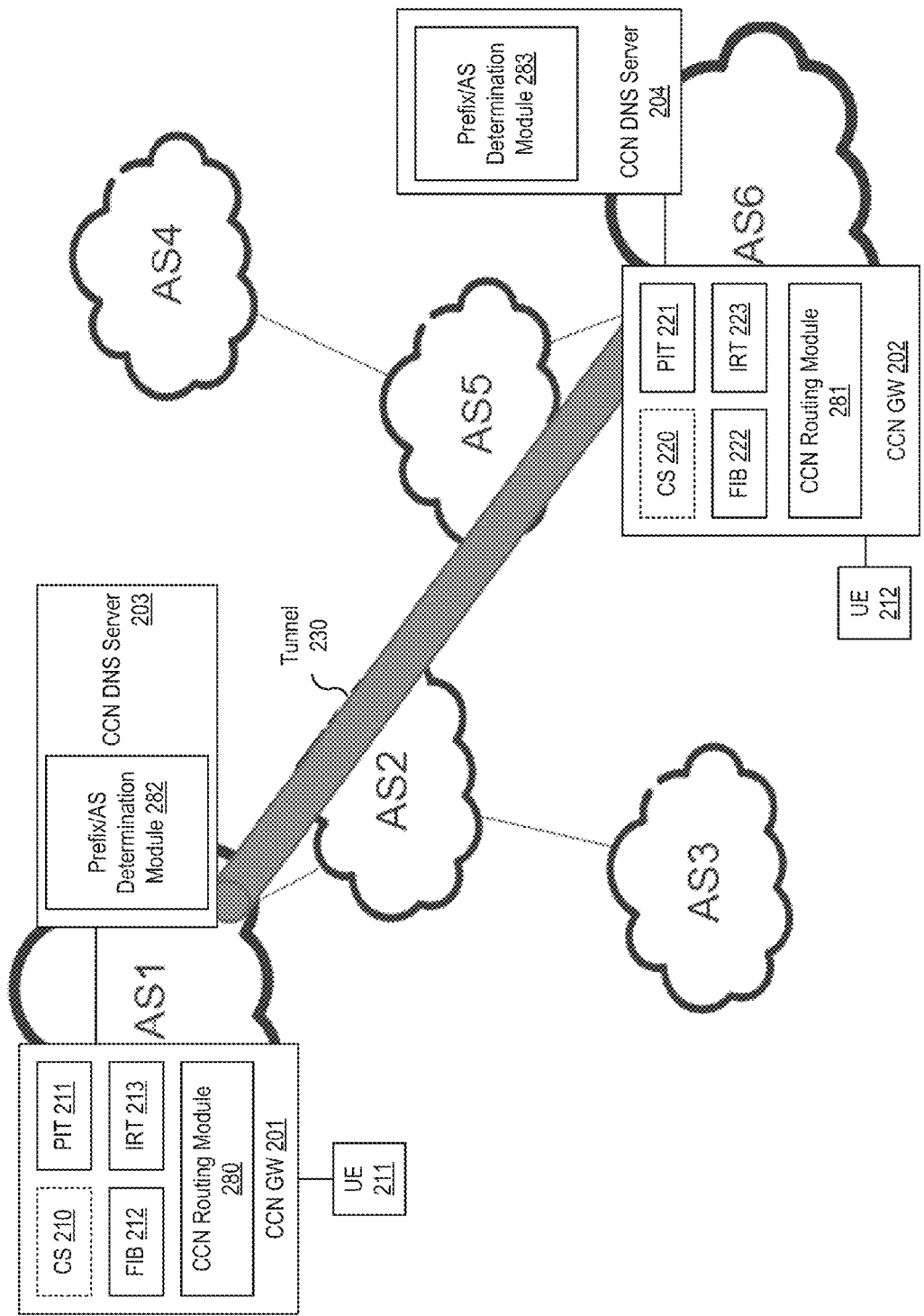
FIG. 2 is a block diagram illustrating an Internet architecture comprising of CCN networks according to one embodiment.

FIG. 2 is a block diagram illustrating an Internet architecture comprising of CCN networks according to one embodiment. Autonomous systems (ASs) are independent networks which are communicatively coupled to each other to form the Internet. In the illustrated embodiment, the Internet comprises of six ASs, illustrated as AS1-AS6. Each AS is identified by an AS name, and comprises a CCN gateway (GW) and a CCN domain name system (DNS) server, wherein each CCN GW is communicatively coupled to one or more user equipment (UE). In the illustrated embodiment, AS1 and AS6 include CCN GWs 201-202, respectively, and CCN DNS server 203-204, respectively. CCN GWs 201-202 are communicatively coupled to user equipment (UE) 211-212, respectively. One having ordinary skill in the art would recognize that various other network devices can be included as part of each AS without departing from the broader scope and spirit of the present invention.

In conventional CCN systems, only three tables were typically maintained: 1) the forwarding information base (FIB), 2) the pending interest table (PIT), and 3) the content store (CS). In some embodiments of the present CCN GW, a fourth table can be maintained in the form of an interest redirect table (IRT). In the illustrated example, CCN GW 201 includes CS 210, PIT 211, FIB 212, and IRT 213. CCN GW 202 includes CS 220, PIT 221, FIB 222, and IRT 223. The FIB is equivalent to the routing table in IP, except that in CCN, the IP prefixes utilized for matching in the routing table are replaced with content name prefixes of the CCN names.

Throughout the description, references are made to names. As used herein, a name can be a CCN name as defined in CCNx 1.0 Protocol Specification Roadmap, PARC. Apr. 14, 2014, which is hereby incorporated by reference. In one embodiment, a name can comprise of a hierarchy of labels. For example, the name "Carlos/Docs/

Doc1" comprises the labels "Carlos", "Docs", and "Doc1". The left most label (i.e., "Carlos") shall be referred to as the first/top label. Throughout the description, each label is described as being separated by "/" (i.e., a forward slash). It should be understood, however, that other delimiters (e.g., a ".", etc.) can be used without departing from the broader scope and spirit of the present invention.

The PIT stores the CCN interest packets that have been received at an ingress port of the CCN node, but that have not been responded to yet. The entries of these CCN interest packets are referred to as 'pending interests' and are removed from the PIT when a corresponding CCN object is sent toward the originating user equipment that generated the CCN interest packet that was received via the associated ingress port or when the pending interest times out.

The CS is an optional local cache of CCN objects. This cache is optional and can have any size or store any number of CCN objects. CCN nodes can choose not to cache anything (for example in a core network where cache size would need to be huge in order to maximize cache hits). In one embodiment, the CS stores a set of recently received CCN objects.

In one embodiment, the IRT includes a plurality of entries, each of which includes a content name prefix and a corresponding remote AS name identifying a remote AS where the content identified by the content name prefix is located at. Each of the CS, PIT, FIB, and/or IRT is implemented as one or more data structures stored in one or more storage devices accessible by the corresponding CCN GW. The CS, PIT, FIB, and IRT are described in further details below.

According to one embodiment, each CCN GW includes a CCN routing module configured to use at least the information stored in its CS, PIT, FIB, and/or IRT to determine how interests and content objects are to be forwarded. In the illustrated example, CCN GWs 201-202 include CCN routing modules 280-281, respectively, each of which can be implemented in software, firmware, hardware, or any combination thereof.

Each CCN node also provides a set of network interfaces also referred to as "faces" over which CCN interest packets are received and forwarded and similarly over which CCN response packets are received and forwarded. These network interfaces can represent a physical link or a Layer 2 interface. The network interfaces can also represent, in some embodiments, a transport protocol such as TCP/IP (in overlay mode) or even an application.

In one embodiment, each CCN DNS server is a network device that includes, but is not limited to, a prefix/AS determination module configured to receive CCN DNS requests comprising of content names, and to determine the prefixes of the content names and the names of the ASs where the objects identified by the content names are located at. In one such embodiment, each prefix/AS determination module is further configured to generate CCN DNS responses using the determined prefixes and AS names and send the CCN DNS responses back to the CCN GWs that sent the CCN DNS request. In the illustrated embodiment, CCN DNS servers 203-204 include prefix/AS determination modules 282-283, respectively, each of which can be implemented in software, firmware, hardware, or any combination thereof.

In IP routing, when a content moves from one network node to another, the routing of the message is determined based on the IP address of the new node that the content has moved to. Thus, the routing space is limited to the number of nodes in the network. In CCN, however, when the content moves from one node to the next, the routing of the interest message remains based on the same content name. In other words, the number routes that need to be mapped to each content can be substantial because theoretically the content can be located at any node in the network. Thus, the routing space in a CCN network can become unmanageable and unscalable. Embodiments of the present invention overcome such limitations by performing 2-level routing (by using the content name and the AS name), wherein CCN messages are routed between ASs using the AS name. In this way, the routing space can be confined to number of ASs in the Internet (which is currently about 32,000 in the Internet). Embodiments of 2-level routing shall now be described in greater details through discussion of various other figures below.

Figure 3:
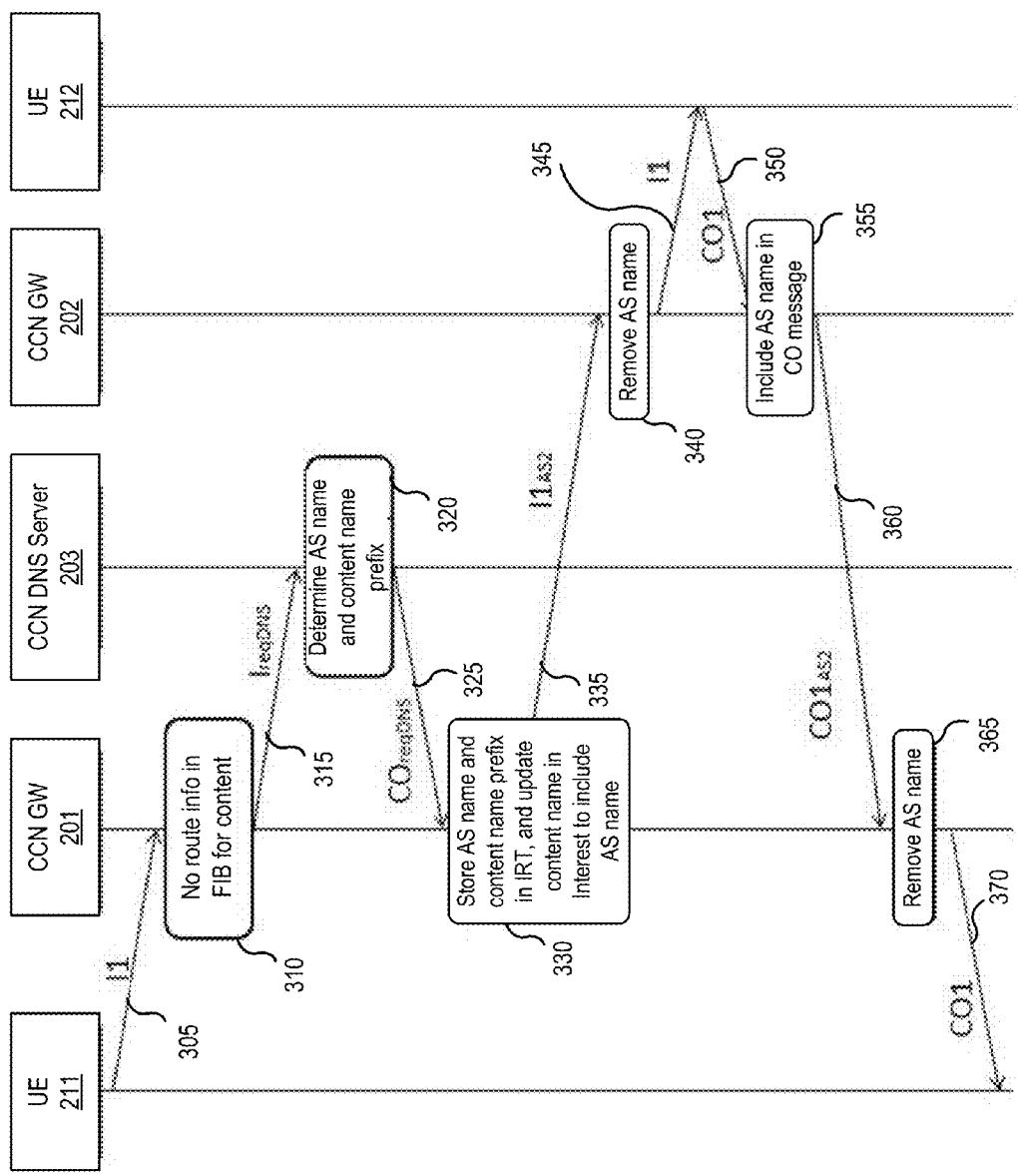
FIG. 3 is a transaction diagram illustrating transactions for performing 2-level routing in CCN according to one embodiment.

FIG. 3 is a transaction diagram illustrating transactions for performing 2-level routing in CCN according to one embodiment. The transactions of FIG. 3 assume a network topology similar to the network topology illustrated in FIG. 2. Referring now to FIG. 3, at transaction 305, UE 211 sends an interest message to CCN GW 201 requesting for a content. The interest message includes a content name identifying the requested content.

At transaction 310, CCN GW 201 determines that the content being requested in not located at the local AS (i.e., AS1). For example, CCN GW 201 determines that the content name included in the interest message is not in its FIB 212. At transaction 315, in response to determining the content is not located in its local AS, CCN GW 201 sends a DNS request comprising of the content name to CCN DNS server 203.

At transaction 320, CCN DNS server 203 determines the name of the AS where the content is located. CCN DNS server 203 is also configured to determine a prefix of the content name, wherein the prefix size is determined based on whether contents are located at the same AS.

At transaction 325, CCN DNS server 203 generates a DNS response comprising of the content name prefix and the determined AS name, and sends the DNS response to CCN GW 201. At transaction 330, CCN GW 201 stores the received content name prefix and the AS name in an entry of IRT 213. In this way, when another interest message is received requesting for the same content, CCN GW 201 does not have to re-request CCN DNS server 203 for the AS name.

At transaction 335, CCN GW 201 updates the content name to include the AS name, and forwards the interest message that includes the updated content name to CCN GW 202. In one embodiment, the delimiter for the content name and the AS name in the interest message is "|" (although the invention is not so limited, and any other predetermined delimiter can be used).

At transaction 340, in response to detecting an AS name in the interest message (e.g., by detecting the predetermined delimiter), CCN GW 202 updates the content name by removing the AS name. At transaction 345, CCN GW 202 forwards the interest message to UE 212 (where the content is located) using the routing information in its FIB 222.

At transaction 350, UE 212 sends a content object (CO) message comprising of the requested content to CCN GW 202. At transaction 355, CCN GW 202 updates the content name in the CO message to include the AS name that it had removed from the interest message that requested the content. At transaction 360, CCN GW 202 forwards the CO message with the updated content name to CCN GW 201. At transaction 365, CCN GW 201 detects the AS name (e.g., by detecting the predetermined AS name delimiter), and removes it from the content name. At transaction 370, CCN GW 201 forwards the CO message to UE 211.

FIG. 4 is a block diagram illustrating a mechanism for performing 2-level routing in CCN according to one embodiment. FIG. 4 illustrates, according to one embodiment, how CCN GW 201 updates its CS 210, PIT 211, FIB 212, and IRT 213 in response to the illustrated operations. At operation 405, FIB 212 is initialized with the routing information for all the remote ASs and all the content names in the local AS. In the illustrated example, FIB 212 has been initialized with the FIB entry {AS2, F#10}. Throughout the description, references are made to face identifiers (IDs) "F#n". As used herein, the "n" in "F#n" represents a number that identifies the face. For example, "F#10" is a face ID that identifies face 10. Throughout the description, a FIB entry is denoted as "FIB entry {AS_name, F#n}, wherein "F#n" identifies the face on which traffic destined for the AS with the name "AS_name" is to be forwarded on. Thus, in this example, the FIB entry {AS2, F#10} indicates that traffic intended for the AS with the name AS2 is to be forwarded on face 10.

At operation 410, CCN GW 201 receives interest1 {Carlos/Docs/Doc1} on face 0. Throughout the description, an interest is denoted by "interest {content_name}", wherein "content_name" is a content name identifying a content which is being requested by the interest. Thus, in this example, interest1 {Carlos/Docs/Doc1} serves as a request for content identified by the content name "Carlos/Docs/Doc1". At operation 415, in response to determining that the content name "Carlos/Docs/Doc1" does not exist in its CS 210, PIT 211, FIB 212, and IRT 213, CCN GW 201 sends/transmits a DNS request {Carlos/Docs/Doc1} to CCN DNS server 203. Throughout the description, a DNS request is denoted by "DNS request {content_name}", wherein "content_name" is a content name identifying a content located at an AS, for which the DNS request is requesting the name of. Thus, in this example, the DNS request {Carlos/Docs/Doc1} serves as a request for the name of the AS where the content identified by "Carlos/Docs/Doc1" is located at.

At operation 420, CCN GW 201 receives a DNS response {Carlos/Docs, AS2}. Throughout the description, a DNS response is denoted by "DNS response {name_prefix, AS_name}", wherein "name_prefix" is a prefix of a content name that was included in the corresponding DNS request, and "AS_name" is the name of the AS where the content identified by "name_prefix" is located at. Thus, in this example, the DNS response {Carlos/Docs, AS2} indicates that the content identified by the content name prefix "Carlos/Docs" is located at the AS with the name "AS2".

According to one embodiment, IRT 212 includes a plurality of entries, each entry comprising of a content name prefix and an associated remote AS name, wherein each remote AS name identifies a remote AS where a content identified by the associated content name prefix is located at. At operation 425, CCN GW 201 adds an IRT entry {Carlos/Docs, AS2} to IRT 212. Throughout the description, an IRT entry is denoted by "IRT entry {prefix, AS_name}", wherein "prefix" is a content name prefix, and "AS_name" is a name of an AS where a content identified by "prefix" is located at. Thus, in this example, the IRT entry {Carlos/Docs, AS2} indicates that the content(s) identified by the prefix "Carlos/Docs" is located at the AS with the name "AS2".

At operation 430, CCN GW 201 generates a 2-level (2L) content name, wherein the 2L content name comprises the content name included in interest1 and the name of the AS where the content (identified by the content name in interest1) is located at. In this example, CCN GW 201 generates a 2L content name comprising "AS2|Carlos/Docs/Doc1". According to one embodiment, the AS name and the content name in a 2L content name are separated by a vertical bar ("|"). It should be understood, however, that other conventions can be used without departing from the broader scope and spirit of the present invention.

According to one embodiment, PIT 211 includes a plurality of entries, each entry comprising of a 2L content name (or a content name) and one or more associated face IDs, wherein each face ID identifies a face on which an interest message requesting for a content identified by the associated 2L content name (or content name) was received. The face IDs identify the faces that a CO containing the requested content is to be forwarded on (described in further details below). Each PIT entry indicates that an interest requesting for the identified content has been previously forwarded. As part of operation 430, in response to determining the 2L content name "AS2|Carlos/Docs/Doc1" is not in PIT 211, CCN GW 201 adds a PIT entry {AS2|Carlos/Docs/Doc1, F#0} to PIT 211. Throughout the description, a PIT entry is denoted by "PIT entry {content_name, F#n, . . . , F#m}", wherein each "F#" identifies a face on which an interest requesting for the content identified by "content_name" was received on. A PIT entry may also be denoted by "PIT entry {2L_content_name, F#n, . . . , F#m}", wherein "2L_content_name" is a 2L content name comprising of an AS name and a content name. Thus, in this example, the PIT entry {AS2|Carlos/Docs/Doc1, F#0} indicates that interest1 {Carlos/Docs/Doc1} was received on face 0. Further, this PIT entry indicates that when a CO containing the requested content is received by CCN GW 201, it should be forwarded toward the requestor on face 0.

At operation 435, CCN GW 201 updates interest1 to include the 2L content name (i.e., "AS2|Carlos/Docs/Doc1") instead of the content name (i.e., "Carlos/Docs/Doc1") that was included in the interest1 when it was received. As part of operation 435, CCN GW 201 determines that the 2L content name "AS2|Carlos/Docs/Doc1" matches the AS2 prefix in the FIB entry {AS2, F#10} in FIB 212. Accordingly, CCN GW 201 forwards the updated interest1 {AS2|Carlos/Docs/Doc1} toward AS2 on face 10.

At operation 440, CCN GW 201 receives interest2 {Carlos/Docs/Doc1} on face 1. At operation 445, CCN GW 201 determines that the content name "Carlos/Docs/Doc1" does not exist in its CS 210, PIT 211, and FIB 212. CCN GW 201 determines, however, that the content name "Carlos/Docs/Doc1" matches the prefix "Carlos/Docs" in the IRT entry {Carlos/Docs, AS2} of IRT 213. Accordingly, CCN GW 201 determines that the requested content identified by "Carlos/Docs/Doc1" is located at the AS with the name AS2.

At operation 445, CCN GW 201 generates a 2L content name, wherein the 2L content name comprises the content name included in interest2 and the name of the AS where the content is located at. In this example, CCN GW 201 generates a 2L content name comprising "AS2|Carlos/Docs/Doc1".

As part of operation 445, CCN GW 201 determines that the 2L content name "AS2|Carlos/Docs/Doc1" matches the 2L content name in the PIT entry {AS2|Carlos/Docs/Doc1, F#0}, indicating that another interest requesting for the same content has been previously transmitted. In response to such a determination, CCN GW 201 prevents multiple interests requesting for the same content from being forwarded by dropping interest2 (i.e., not forwarding interest2). Further, CCN GW 201 adds "F#1" to the matching PIT entry, indicating that interest2 requesting for the same content was received on face 1. In this way, when the CO containing the requested content is received, CCN GW 201 can use the "F#'s" in the matching PIT entry to determine that the CO should be forwarded on both faces 0 and 1.

At operation 450, CCN GW 201 receives CO1 {AS2|Carlos/Docs/Doc1, Obj1}. Throughout the description, a CO is denoted by "CO {2L_content_name, object}", wherein "object" is the content being returned in response to a corresponding interest, "2L_content_name" comprises a content name and an AS name, wherein the content name identifies the "object" (i.e., content), and the AS name identifies the AS where the "object" is located at. Thus, in this example, CO1 {AS2|Carlos/Docs/Doc1, Obj1} includes the content "Obj1" identified by the content name "Carlos/Docs/Doc1", wherein the content "Obj1" is located at the AS with the name AS2.

At operation 455, CCN GW 201 identifies the faces to forward CO1 on by using the 2L content name "AS2|Carlos/Docs/Doc1" (included in received CO1) to lookup PIT 211. CCN GW 201 determines that "AS2|Carlos/Docs/Doc1" matches the 2L content name in the PIT entry {AS2|Carlos/Docs/Doc1, F#0, F#1}. Accordingly, CCN GW 201 determines that CO1 is to be forwarded on faces 0 and 1.

At operation 460, CCN GW 201 determines that the name included in CO1 is a 2L content name (e.g., by detecting the predetermined delimiter "|") comprising of an AS name and a content name. In response to such a determination, CCN GW 201 updates CO1 to include just the content name "Carlos/Docs/Doc1" instead of the 2L content name "AS2|Carlos/Docs/Doc1" that was included in the received CO1.

According to one embodiment, CS 210 includes a plurality of entries, each entry comprising of a content name and an associated object/content, wherein the content name identifies the content included in the same entry. As part of operation 460, CCN GW 201 adds a CS entry comprising of the content name (without the AS name) and the corresponding content to CS 210. In this example, CCN GW 201 adds the CS entry {Carlos/Docs/Doc1, Obj1} to CS 210. Throughout the description, a CS entry is denoted by "CS entry {content_name, obj}", wherein "content_name" is a content name that identifies the content "obj". Thus, in this example, the CS entry {Carlos/Docs/Doc1, Obj1} includes the content "Obj1" identified by the content name "Carlos/Docs/Doc1".

At operation 465, CCN GW 201 forwards CO1 {Carlos/Docs/Doc1, Obj1} on the identified faces 0 and 1. As part of operation 465, CCN GW 201 removes the matching PIT entry {AS2|Carlos/Docs/Doc1, F#0, F#1} from PIT 211.

At operation 470, CCN GW 201 receives interest3 {Carlos/Docs/Doc1} on face 2. At operation 475, CCN GW 201 determines that the content name "Carlos/Docs/Doc1" (included in interest3) matches the content name in the CS entry {Carlos/Docs/Doc1, Obj1} of CS 210. Accordingly, CCN GW 201 uses the content name and the content "Obj1" from the matching CS entry to generate CO3 {Carlos/Docs/Doc1, Obj1}, and forwards it on the face that interest3 was received on (i.e., face 2).

Figure 5:
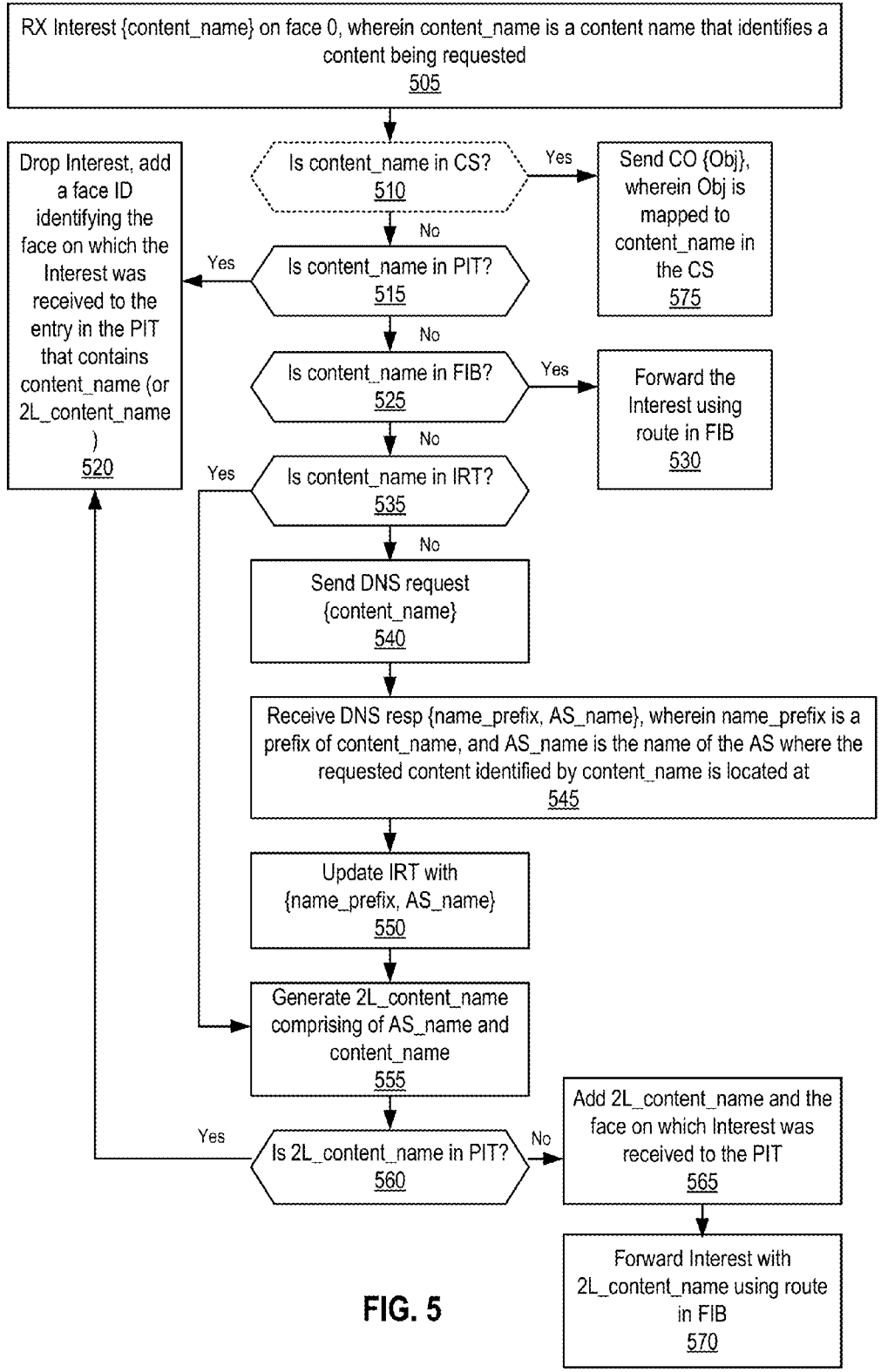
FIG. 5 is a flow diagram illustrating a method for performing 2-level routing in CCN according to one embodiment.

FIG. 5 is a flow diagram illustrating a method for performing 2-level routing in CCN according to one embodiment. For example, method 500 can be performed by CCN routing module 280 of CCN GW 201. Method 500 can be implemented in software, firmware, hardware, or any combination thereof. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FIG. 5 shall be described with reference to the operations illustrated in FIG. 4. Referring now to FIG. 5, at block 505 a CCN GW receives an interest {content_name} on face 0, wherein "content_name" is a content name that identifies a content being requested by the interest. For example, referring now to FIG. 4, at operation 410 CCN GW 201 receives interest1 {Carlos/Docs/Doc1} on face 0, wherein "Carlos/Docs/Doc1" is a content name identifying the content being requested.

Referring now to FIG. 5, at block 510 the CCN GW determines whether content_name is in the CS. At block 515 (the "No" branch of block 510), the CCN GW determines whether content_name is in the PIT. At block 525 (the "No" branch of block 515), the CCN GW determines whether content_name is in the FIB. At block 535 (the "No" branch of block 525), the CCN GW determines whether content_name is in the IRT. At block 540 (the "No" branch of block 535), the CCN GW sends a DNS request {content_name} to a DNS server. For example, referring now to FIG. 4, at operation 415, in response to determining that the content name "Carlos/Docs/Doc1" does not exist in its CS 210, PIT 211, FIB 212, and IRT 213, CCN GW 201 sends/transmits a DNS request {Carlos/Docs/Doc1} to CCN DNS server 203.

Referring now to FIG. 5, at block 545 the CCN GW receives a DNS response {name_prefix, AS_name}, wherein "name_prefix" is a prefix of content_name that was included in the DNS request, and "AS_name" is the name of the AS where the requested content identified by content_name is located at. Name_prefix is described in further details below. For example, referring now to FIG. 4, at operation 420 CCN GW 201 receives a DNS response {Carlos/Docs, AS2} indicating that the content identified by "Carlos/Docs" is located at the AS with the name "AS2".

Referring now to FIG. 5, at block 550 the CCN GW adds the information received from the DNS server (i.e., {name_prefix, AS_name}) to the IRT. For example, referring now to FIG. 4, at operation 425 CCN GW 201 adds an IRT entry {Carlos/Docs, AS2} to IRT 212, the IRT entry indicating that the content(s) identified by "Carlos/Docs" is located at the AS with the name "AS2".

Referring now to FIG. 5, at block 555 the CCN GW generates 2L_content_name comprising of content_name and AS_name. At block 560, the CCN GW determines whether 2L_content_name is in the PIT. At block 565 (the "No" branch of block 560), the CCN GW adds 2L_content_name and the face on which the interest was received to an entry in the PIT. For example, referring now to FIG. 4, at operation 430, CCN GW 201 generates a 2L content name comprising "AS2|Carlos/Docs/Doc1". As part of operation 430, in response to determining the 2L content name is not in PIT 211, CCN GW 201 adds a PIT entry {AS2|Carlos/Docs/Doc1, F#0} to PIT 211.

Referring now to FIG. 5, at block 570, the CCN GW forwards the interest with 2L_content_name using the route information in the FIB. For example, referring now to FIG. 4, at operation 435 CCN GW 201 updates interest1 to include the 2L content name "AS2|Carlos/Docs/Doc1" instead of the content name "Carlos/Docs/Doc1" that was included in the interest1 when it was received. As part of operation 435, CCN GW 201 determines that the 2L content name "AS2|Carlos/Docs/Doc1" matches the AS2 prefix in the FIB entry {AS2, F#10} in FIB 212. Accordingly, CCN GW 201 forwards the updated interest1 {AS2|Carlos/Docs/Doc1} toward AS2 on face 10.

Referring now to FIG. 5. Returning now back to block 535. In response to determining content_name is in the IRT (the "Yes" branch of block 535), the CCN GW transitions to block 555. At block 555, the CCN GW generates 2L_content_name comprising of content_name and AS name in the IRT entry containing the prefix that matches content_name. The CCN GW then transitions to block 560. At block 560, in response to determining 2L_content_name is in the PIT, the CCN GW transitions to block 520. At block 520 (the "Yes" branch of block 560), the CCN GW drops the interest, and adds the face on which the interest was received to the PIT. For example, referring now to FIG. 4, at operation 440 CCN GW 201 receives interest2 {Carlos/Docs/Doc1} on face 1. At operation 445, CCN GW 201 determines that the content name "Carlos/Docs/Doc1" does not exist in its CS 210, PIT 211, and FIB 212. CCN GW 201 determines, however, that the content name "Carlos/Docs/Doc1" matches the prefix "Carlos/Docs" in the IRT entry {Carlos/Docs, AS2} of IRT 213. As part of operation 445, CCN GW 201 generates a 2L content name comprising "AS2|Carlos/Docs/Doc1" As part of operation 445, CCN GW 201 determines that the 2L content name "AS2|Carlos/Docs/Doc1" matches the 2L name in the PIT entry {AS2|Carlos/Docs/Doc1, F#0}, indicating that another interest requesting for the same content has been previously transmitted. In response to such a determination, CCN GW 201 drops interest2. Further, CCN GW 201 adds "F#1" to the matching PIT entry, indicating that interest2 requesting for the same content was received on face 1.

Referring now to FIG. 5. Returning now back to block 515. In response to determining content_name is in the PIT (the "Yes" branch of block 515), the CCN GW transitions to block 520, and performs the operations as described above. Typically, this is the path taken when the CCN GW receives multiple interests requesting for the same content that is located in the local AS, and one of the interest has been previously forwarded.

Returning now back to block 525. In response to determining content_name is in the FIB (the "Yes" branch of block 525), the CCN GW transitions to block 530, and forwards the interest using the route in the FIB. Typically, this is the path taken when the CCN GW receives a request for content that is located in the local AS, and the interest requesting for the same content has not been previously forwarded.

Returning now back to block 510. In response to determining content_name is in the CS (the "Yes" branch of block 510), the CCN GW transitions to block 575 and sends the content/object included in the matching CS entry on the same face that the interest was received on. For example, referring now to FIG. 4, at operation 470, CCN GW 201 receives interest3 {Carlos/Docs/Doc1} on face 2. At operation 475, CCN GW 201 determines that the content name "Carlos/Docs/Doc1" matches the content name in the CS entry {Carlos/Docs/Doc1, Obj1} of CS 210. Accordingly, CCN GW 201 uses the content name and the content "Obj1" from the matching CS entry to generate CO3 {Carlos/Docs/Doc1, Obj1}, and forwards it on the face that interest3 was received on (i.e., face 2).

Figure 6:
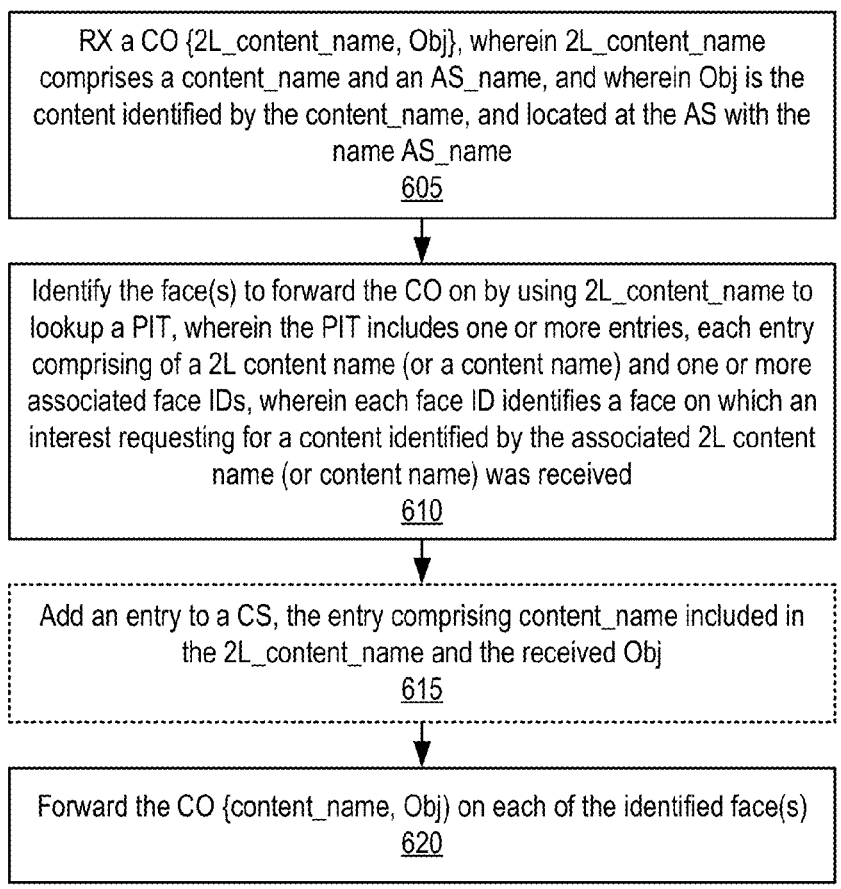
FIG. 6 is a flow diagram illustrating a method for performing 2-level routing in CCN according to one embodiment.

FIG. 6 is a flow diagram illustrating a method for performing 2-level routing in CCN according to one embodiment. For example, method 600 can be performed by CCN routing module 280 CCN GW 201. Method 600 can be implemented in software, firmware, hardware, or any combination thereof. FIG. 6 shall be described with reference to the operations illustrated in FIG. 4. Referring now to FIG. 6, at block 605, a CCN GW receives a CO {2L_content_name, Obj}, wherein "2L_content_name" comprises "content_name" and "AS_name", and wherein "Obj" is the content being returned by the CO in response to a corresponding interest. "Content_name" is a content name that identifies the "Obj", and "AS_name" is the name of the AS where the content "Obj" is located at. For example, referring now to FIG. 4, at operation 450 CCN GW 201 receives CO1 {AS2|Carlos/Docs/Doc1, Obj1}, wherein the 2L content name "AS2|Carlos/Docs/Doc1" comprises the content name "Carlos/Docs/Doc1" and the AS name "AS2", and wherein "Obj1" is the content being returned by CO1 in response to a corresponding interest.

Referring now to FIG. 6, at block 610 the CCN GW identifies the face(s) to forward the CO on by using 2L_content_name to lookup a PIT, wherein the PIT includes one or more entries, each entry comprising of a 2L content name (or a content name) and one or more associated face identifiers (IDs), wherein each face ID identifies a face on which an interest requesting the content identified by the associated 2L content name (or content name) was received. For example, referring now to FIG. 4, at operation 455 CCN GW 201 identifies the faces to forward CO1 on by using the 2L content name "AS2|Carlos/Docs/Doc1" (included in the received CO1) to lookup PIT 211. CCN GW 201 determines that the 2L content name "AS2|Carlos/Docs/Doc1" matches the 2L content name in the PIT entry {AS2|Carlos/Docs/Doc1, F#0, F#1}. Accordingly, CCN GW 201 determines that CO1 is to be forwarded on faces 0 and 1.

Referring now to FIG. 6, at optional block 615 the CCN GW adds an entry to a CS, the CS entry comprising content_name included in 2L_content_name and the received Obj. For example, referring now to FIG. 4, at operation 460 CCN GW 201 determines that the name "AS2|Carlos/Docs/Doc1" included in CO1 is a 2L content name (e.g., by detecting the predetermined delimiter "|") comprising of an AS name (i.e., "AS2") and a content name (i.e., "Carlos/Docs/Doc1". In response to such a determination, CCN GW 201 updates CO1 to include just the content name "Carlos/Docs/Doc1" instead of the 2L content name "AS2|Carlos/Docs/Doc1" that was included in the received CO1. As part of operation 460, CCN GW 201 adds the CS entry {Carlos/Docs/Doc1, Obj1} to CS 210.

Referring now to FIG. 6, at block 620 the CCN GW forwards the CO {content_name, Obj} on each of the identified face(s). As part of block 625, the CCN GW also removes the matching entry from the PIT. For example, referring now to FIG. 4, CCN GW 201 forwards CO1 {Carlos/Docs/Doc1, Obj1} on the identified faces 0 and 1. As part of operation 465, CCN GW 201 removes the matching PIT entry {AS2|Carlos/Docs/Doc1, F#0, F#1} from PIT 211.

Figure 7:
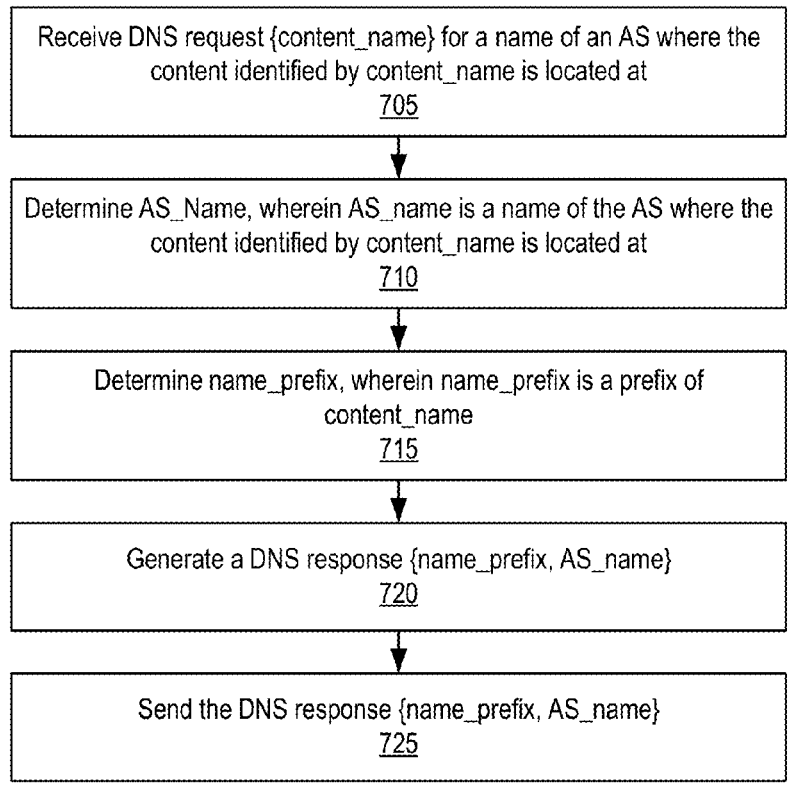
FIG. 7 is a flow diagram illustrating a method for performing 2-level routing in CCN according to one embodiment.

FIG. 7 is a flow diagram illustrating a method for performing 2-level routing in CCN according to one embodiment. For example, method 700 can be performed by prefix/AS determination module 282 of CCN DNS server 203. Method 700 can be implemented in software, firmware, hardware, or any combination thereof. FIG. 7 shall be described with reference to the operations illustrated in FIG. 4. Referring now to FIG. 7, at block 705 a CCN DNS server receives a DNS request {content_name}, requesting for a name of an AS where the content identified by content_name is located at. For example, referring now to FIG. 4, at operation 415 CCN DNS server 203 receives a DNS request {Carlos/Docs/Doc1} from CCN GW 201.

Referring now to FIG. 7, at block 710 the CCN DNS server determines AS_name, wherein AS_name is a name of the AS where the content identified by content_name is located at. At block 715, the CCN DNS server determines name_prefix, wherein name_prefix is a prefix of content_name. According to one embodiment, the CCN DNS server determines the size of the prefix based on whether the contents of each label of content_name are located at the same AS. By way of example, suppose there are 2 documents in the network, wherein the 2 documents are identified by the names "Carlos/Docs/Doc1" and "Carlos/Docs/Doc2". It is possible that the first document identified by "Carlos/Docs/Doc1" is located on, for example, a home PC, while the second document identified by "Carlos/Docs/Doc1" is located in, for example, DropBox. Thus, the 2 documents are not located in the same AS (assuming the home PC and the DropBox storage server are not located at the same AS). In such a scenario, the CCN DNS server, in response to receiving a DNS request {Carlos/Docs/Doc1}, would return the prefix comprising of the entire content name (i.e., all the labels) included in the DNS request.

By way of further illustration, suppose that both documents are located on the same home PC, and thus, are located at the same AS. In such a scenario, the CCN DNS server, in response to receiving a DNS request {Carlos/Docs/Doc1}, would return the prefix of "Carlos/Docs" because all documents (i.e., contents) identified by "Carlos/Docs" are located at the same AS.

By way of further illustration, suppose that there is also a video identified by the name "Carlos.Videos.Video1". Suppose further that the video and the 2 documents are all located on the home PC, and thus, are all located at the same AS. In such a scenario, the CCN DNS server, in response to receiving a DNS request {Carlos/Docs/Doc1}, would return the prefix of "Carlos" because all contents identified by the prefix "Carlos" are located at the same AS. If, however, the 2 documents are located at the same AS, while the video is located at a different AS, then the CCN DNS server, in response to receiving a DNS request {Carlos/Docs/Doc1}, would return the prefix of "Carlos/Docs" because although all contents identified by the prefix "Carlos/Docs" are located at the same AS, not all contents identified by the prefix "Carlos" are located at the same AS.

Referring still to FIG. 7, at block 720 the CCN DNS server generates a DNS response {name_prefix, AS_name}. At block 725, the CCN DNS server sends the DNS response {name_prefix, AS_name}. For example, referring now to FIG. 4, at operation 420 CCN DNS server 203 sends DNS response {Carlos/Docs, AS2} to CCN GW 201.

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 800A, E, and F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application-specific integrated-circuits (ASICs) and a proprietary operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A).

Software 820 can include code which when executed by networking hardware 810, causes networking hardware 810 to perform operations of one or more embodiments of the present invention as part networking software instances 822.

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850. During operation, the processor(s) 842 execute the software 850 to instantiate one or more sets of one or more applications 864A-R. While one embodiment does not implement virtualization, alternative embodiments may use different forms of virtualization—represented by a virtualization layer 854 and software containers 862A-R. For example, one such alternative embodiment implements operating system-level virtualization, in which case the virtualization layer 854 represents the kernel of an operating system (or a shim executing on a base operating system) that allows for the creation of multiple software containers 862A-R that may each be used to execute one of the sets of applications 864A-R. In this embodiment, the multiple software containers 862A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 854 represents a hypervisor (sometimes referred to as a virtual machine monitor (VMM)) or a hypervisor executing on top of a host operating system; and 2) the software containers 862A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 864A-R, as well as the virtualization layer 854 and software containers 862A-R if implemented, are collectively referred to as software instance(s) 852. Each set of applications 864A-R, corresponding software container 862A-R if implemented, and that part of the hardware 840 that executes them (be it hardware dedicated to that execution and/or time slices of hardware temporally shared by software containers 862A-R), forms a separate virtual network element(s) 860A-R.

The virtual network element(s) 860A-R perform similar functionality to the virtual network element(s) 830A-R—e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 862A-R differently. For example, while embodiments of the invention are illustrated with each software container 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 862A-R to VNEs also apply to embodiments where such a finer level of granularity is used.

In certain embodiments, the virtualization layer 854 includes a virtual switch that provides similar forwarding services as a physical Ethernet switch. Specifically, this virtual switch forwards traffic between software containers 862A-R and the NIC(s) 844, as well as optionally between the software containers 862A-R; in addition, this virtual switch may enforce network isolation between the VNEs 860A-R that by policy are not permitted to communicate with each other (e.g., by honoring virtual local area networks (VLANs)).

Software 850 can include code which when executed by processor(s) 842, cause processor(s) 842 to perform operations of one or more embodiments of the present invention as part software containers 862A-R.

The third exemplary ND implementation in FIG. 8A is a hybrid network device 806, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service—e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software containers 862A-R may operate as servers; the same would be true for the hybrid network device 806; in the case of the special-purpose network device 802, one or more such servers could also be run on a virtualization layer executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 870A-H (e.g., the compute resource(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device 802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 880 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 870I in one of the virtual network(s) 892 of FIG. 8D, according to some embodiments of the invention. FIG. 8E shows that in this virtual network, the NE 870I is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
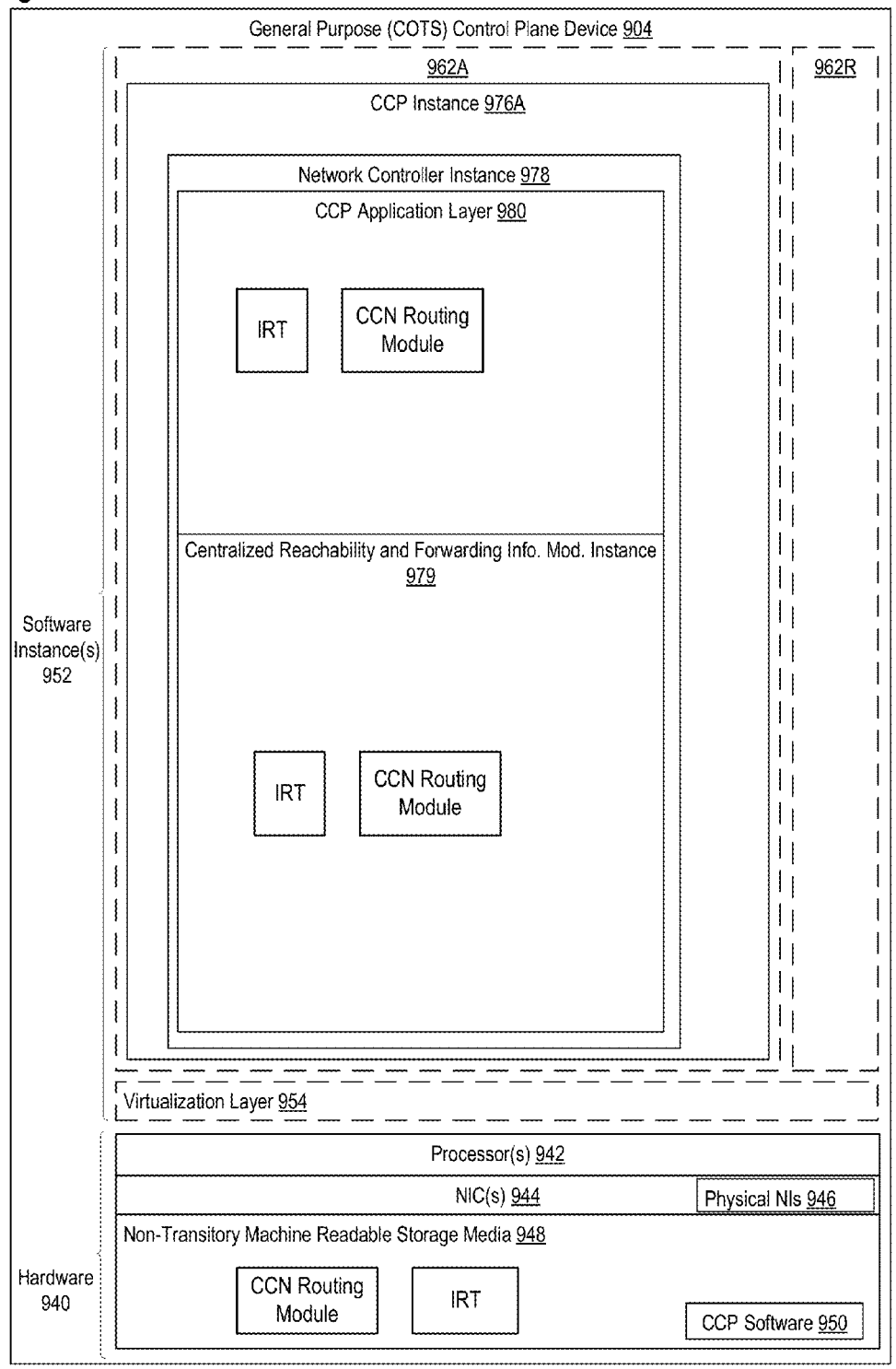
FIG. 9 illustrates a general purpose control plane device with centralized control plane (CCP) software, according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein centralized control plane (CCP) software 950.

In embodiments that use compute virtualization, the processor(s) 942 typically execute software to instantiate a virtualization layer 954 and software container(s) 962A-R (e.g., with operating system-level virtualization, the virtualization layer 954 represents the kernel of an operating system (or a shim executing on a base operating system) that allows for the creation of multiple software containers 962A-R (representing separate user space instances and also called virtualization engines, virtual private servers, or jails) that may each be used to execute a set of one or more applications; with full virtualization, the virtualization layer 954 represents a hypervisor (sometimes referred to as a virtual machine monitor (VMM)) or a hypervisor executing on top of a host operating system, and the software containers 962A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 950 (illustrated as CCP instance 976A) is executed within the software container 962A on the virtualization layer 954. In embodiments where compute virtualization is not used, the CCP instance 976A on top of a host operating system is executed on the "bare metal" general purpose control plane device 904. The instantiation of the CCP instance 976A, as well as the virtualization layer 954 and software containers 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user—interfaces). At a more abstract level, this CCP application layer 980 within the centralized control plane 876 works with virtual network view(s) (logical view(s) of the network) and the middleware layer provides the conversion from the virtual networks to the physical view.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a content centric networking (CCN) gateway located in an autonomous system (AS), wherein the CCN gateway is communicatively coupled to a CCN domain name system (DNS) server, the method comprising:
receiving, at the CCN gateway, a first interest message from a requester, the first interest message including a first content name identifying a first content being requested by the first interest message;
in response to determining the first content is not located in the AS, determining a first remote AS name that identifies a first remote AS where the first content is located;
generating a first 2-level (2L) content name including the first remote AS name and the first content name;
forwarding the first interest message including the first 2L content name toward the location of the first content;
in response to receiving a first content object (CO) message including the first 2L content name and the first content, forwarding the first content to the requester.

2. The method of claim 1, wherein determining the first remote AS name comprises:
determining whether the first content name is included in an interest redirect table (IRT), wherein the IRT includes a plurality of entries, each entry including a content name prefix and an associated remote AS name, wherein each remote AS name identifies a remote AS where a content identified by the associated content name prefix is located at.

3. The method of claim 2, further comprising:
in response to determining the first content name does not match any of the content name prefixes in the IRT, sending a DNS request including the first content name to the CCN DNS server;
receiving, from the CCN DNS server, a DNS response including a content name prefix and the first remote AS name; and
adding a first entry to the IRT, the first entry including the first remote AS name and the content name prefix included in the DNS response.

4. The method of claim 2, further comprising:
in response to determining the first content name matches a content name prefix in the IRT, determining the first remote AS name to be a remote AS name that is associated with the content name prefix that matches the first content name.

5. The method of claim 1, wherein forwarding the first interest message comprises:
determining the first 2L content name is not in a pending interest table (PIT), wherein the PIT includes a plurality of entries, each entry including a 2L content name or a content name and one or more associated face identifiers (IDs), wherein each face ID identifies a face on which an interest message requesting for a content identified by the associated 2L content name or content name was received; and
adding a first entry to the PIT, the first entry including the first 2L content name and a first face ID identifying the first face on which the first interest was received.

6. The method of claim 1, wherein forwarding the first content comprises:
replacing the first 2L content name in the first CO message with the first content name; and
forwarding the first CO message including the first content name and the first content.

7. The method of claim 1, further comprising:
receiving, on a second face, a second interest message including a second content name identifying a second content being requested by the second interest message;
in response to determining the second content is not located at the AS, determining a second remote AS name that identifies a second remote AS where the second content is located;
generating a second 2L content name including the second remote AS name and the second content name;
determining an interest message requesting for the second content has been forwarded; and
preventing multiple interest messages requesting for the second content from being forwarded by dropping the second interest message.

8. The method of claim 7, wherein determining the interest message requesting for the second content has been forwarded comprises:
determining the second 2L content name is in a pending interest table (PIT), wherein the PIT includes a plurality of entries, each entry including a 2L content name or a content name and one or more associated face identifiers (IDs), wherein each face ID identifies a face on which an interest message requesting for a content identified by the associated 2L content name or content name was received;
adding a face ID identifying the second face on which the second interest message was received to an entry that includes a 2L content name that matches the second 2L content name.

9. The method of claim 8, further comprising:
in response to receiving a second content object (CO) message including the second 2L content name and the second content, forwarding the second content on every face that is identified by face IDs included in the PIT entry that includes the 2L content name that matches the second 2L content name.

10. A content centric networking (CCN) gateway located at an autonomous system (AS), wherein the CCN gateway is communicatively coupled to a CCN domain name system (DNS) server, the CCN gateway comprising:
a set of one or more processors; and
a non-transitory machine-readable storage medium containing code, which when executed by the set of one or more processors, causes the CCN gateway to:
receive, at the CCN gateway, a first interest message from a requester, the first interest message including a first content name identifying a first content being requested by the first interest message;
in response to determining the first content is not located at the AS, determine a first remote AS name that identifies a first remote AS where the first content is located;
generate a first 2-level (2L) content name including the first remote AS name and the first content name;
forward the first interest message including the first 2L content name toward the location of the first content; and
in response to receiving a first content object (CO) message including the first 2L content name and the first content, forward the first content to the requester.

11. The CCN gateway of claim 10, wherein determining the first remote AS name comprises the CCN GW to:
determine whether the first content name is included in an interest redirect table (IRT), wherein the IRT includes a plurality of entries, each entry including a content name prefix and an associated remote AS name, wherein each remote AS name identifies a remote AS where a content identified by the associated content name prefix is located at.

12. The CCN gateway of claim 11, wherein the non-transitory machine-readable storage medium further contains code, which when executed by the set of one or more processors, causes the CCN gateway to:
- in response to determining the first content name does not match any of the content name prefixes in the IRT, send a DNS request including the first content name to the CCN DNS server;
- receive, from the CCN DNS server, a DNS response including a content name prefix and the first remote AS name; and
- add a first entry to the IRT, the first entry including the first remote AS name and the content name prefix included in the DNS response.

13. The CCN gateway of claim 11, wherein the non-transitory machine-readable storage medium further contains code, which when executed by the set of one or more processors, causes the CCN gateway to:
- in response to determining the first content name matches a content name prefix in the IRT, determine the first remote AS name to be a remote AS name that is associated with the content name prefix that matches the first content name.

14. The CCN gateway of claim 10, wherein forwarding the first interest message comprises the CCN gateway to:
- determine the first 2L content name is not in a pending interest table (PIT), wherein the PIT includes a plurality of entries, each entry including a 2L content name or a content name and one or more associated face identifiers (IDs), wherein each face ID identifies a face on which an interest message requesting for a content identified by the associated 2L content name or content name was received; and
- add a first entry to the PIT, the first entry including the first 2L content name and a first face ID identifying the first face on which the first interest was received.

15. The CCN gateway of claim 10, wherein forwarding the first content comprises the CCN gateway to:
- replace the first 2L content name in the first CO message with the first content name; and
- forward the first CO message including the first content name and the first content.

16. The CCN gateway of claim 10, wherein the non-transitory machine-readable storage medium further contains code, which when executed by the set of one or more processors, causes the CCN gateway to:
- receive, on a second face, a second interest message including a second content name identifying a second content being requested by the second interest message;
- in response to determining the second content is not located at the AS, determine a second remote AS name that identifies a second remote AS where the second content is located;
- generate a second 2L content name including the second remote AS name and the second content name;
- determine an interest message requesting for the second content has been forwarded; and
- prevent multiple interest messages requesting for the second content from being forwarded by dropping the second interest message.

17. The CCN gateway of claim 16, wherein determining the interest message requesting for the second content has been forwarded comprises the CCN gateway to:
- determine the second 2L content name is in a pending interest table (PIT), wherein the PIT includes a plurality of entries, each entry including a 2L content name or a content name and one or more associated face identifiers (IDs), wherein each face ID identifies a face on which an interest message requesting for a content identified by the associated 2L content name or content name was received;
- add a face ID identifying the second face on which the second interest message was received to an entry that includes a 2L content name that matches the second 2L content name.

18. The CCN gateway of claim 17, wherein the non-transitory machine-readable storage medium further contains code, which when executed by the set of one or more processors, causes the CCN gateway to:
- in response to receiving a second content object (CO) message including the second 2L content name and the second content, forward the second content on every face that is identified by face IDs included in the PIT entry that includes the 2L content name that matches the second 2L content name.

19. A non-transitory machine-readable storage medium having computer code stored therein, which when executed by a set of one or more processors of a content centric networking (CCN) gateway located at an autonomous system (AS), wherein the CCN gateway is communicatively coupled to a CCN domain name system (DNS) server, causes the CCN gateway to perform operations comprising:
- receiving, at the CCN gateway, a first interest message from a requester, the first interest message including a first content name identifying a first content being requested by the first interest message;
- in response to determining the first content is not located at the AS, determining a first remote AS name that identifies a first remote AS where the first content is located;
- generating a first 2-level (2L) content name including the first remote AS name and the first content name;
- forwarding the first interest message including the first 2L content name toward the location of the first content;
- in response to receiving a first content object (CO) message including the first 2L content name and the first content, forwarding the first content to the requester.

20. The non-transitory machine-readable storage medium of claim 19, wherein determining the first remote AS name comprises:
- determining whether the first content name is included in an interest redirect table (IRT), wherein the IRT includes a plurality of entries, each entry including a content name prefix and an associated remote AS name, wherein each remote AS name identifies a remote AS where a content identified by the associated content name prefix is located at.

21. The non-transitory machine-readable storage medium of claim 20, further comprising:
- in response to determining the first content name does not match any of the content name prefixes in the IRT, sending a DNS request including the first content name to the CCN DNS server;
- receiving, from the CCN DNS server, a DNS response including a content name prefix and the first remote AS name; and
- adding a first entry to the IRT, the first entry including the first remote AS name and the content name prefix included in the DNS response.

22. The non-transitory machine-readable storage medium of claim 20, further comprising:
- in response to determining the first content name matches a content name prefix in the IRT, determining the first remote AS name to be a remote AS name that is associated with the content name prefix that matches the first content name.

23. The non-transitory machine-readable storage medium of claim 19, wherein forwarding the first interest message comprises:
    determining the first 2L content name is not in a pending interest table (PIT), wherein the PIT includes a plurality of entries, each entry including a 2L content name or a content name and one or more associated face identifiers (IDs), wherein each face ID identifies a face on which an interest message requesting for a content identified by the associated 2L content name or content name was received; and
    adding a first entry to the PIT, the first entry including the first 2L content name and a first face ID identifying the first face on which the first interest was received.

24. The non-transitory machine-readable storage medium of claim 19, wherein forwarding the first content comprises:
    replacing the first 2L content name in the first CO message with the first content name; and
    forwarding the first CO message including the first content name and the first content.

25. The non-transitory machine-readable storage medium of claim 19, further comprising:
    receiving, on a second face, a second interest message including a second content name identifying a second content being requested by the second interest message;
    in response to determining the second content is not located at the AS, determining a second remote AS name that identifies a second remote AS where the second content is located;
    generating a second 2L content name including the second remote AS name and the second content name;
    determining an interest message requesting for the second content has been forwarded; and
    preventing multiple interest messages requesting for the second content from being forwarded by dropping the second interest message.

26. The non-transitory machine-readable storage medium of claim 25, wherein determining the interest message requesting for the second content has been forwarded comprises:
    determining the second 2L content name is in a pending interest table (PIT), wherein the PIT includes a plurality of entries, each entry including a 2L content name or a content name and one or more associated face identifiers (IDs), wherein each face ID identifies a face on which an interest message requesting for a content identified by the associated 2L content name or content name was received;
    adding a face ID identifying the second face on which the second interest message was received to an entry that includes a 2L content name that matches the second 2L content name.

27. The non-transitory machine-readable storage medium of claim 26, further comprising:
    in response to receiving a second content object (CO) message including the second 2L content name and the second content, forwarding the second content on every face that is identified by face IDs included in the PIT entry that includes the 2L content name that matches the second 2L content name.

28. A method in a content centric networking (CCN) domain name system (DNS) server that is communicatively coupled to a CCN gateway located at a first autonomous system (AS), the method comprising:
    receiving a DNS request including a first content name identifying a content;
    in response to receiving the DNS request, determining an AS name of an AS where the content is located;
    determining a prefix of the first content name included in the DNS request, wherein the prefix of the first content name identifies a plurality of contents that are all located at the AS; and
    sending a DNS response including the prefix of the first content name and the AS name that identifies the AS where the content is located at.

29. A content centric networking (CCN) domain name system (DNS) server that is communicatively coupled to a CCN gateway located at a first autonomous system (AS), the CCN DNS server comprising:
    a set of one or more processors; and
    a non-transitory machine-readable storage medium containing code, which when executed by the set of one or more processors, causes the CCN DNS server to:
        receive a DNS request including a first content name identifying a content,
        in response to receiving the DNS request, determine an AS name of an AS where the content is located,
        determine a prefix of the first content name included in the DNS request, wherein the prefix of the first content name identifies a plurality of contents that are all located at the AS, and
        send a DNS response including the prefix of the first content name and the AS name that identifies the AS where the content is located.

30. A non-transitory machine-readable storage medium having computer code stored therein, which when executed by a set of one or more processors of a content centric networking (CCN) domain name system (DNS) server that is communicatively coupled to a CCN gateway located at a first autonomous system (AS), causes the CCN DNS server to perform operations comprising:
    receiving a DNS request including a first content name identifying a content;
    in response to receiving the DNS request, determining an AS name of an AS where the content is located;
    determining a prefix of the first content name included in the DNS request, wherein the prefix of the first content name identifies a plurality of contents that are all located at the AS; and
    sending a DNS response including the prefix of the first content name and the AS name that identifies the AS where the content is located.

* * * * *